US009523775B2

(12) United States Patent
Chakraborty et al.

(10) Patent No.: US 9,523,775 B2
(45) Date of Patent: Dec. 20, 2016

(54) SYSTEM TO EXTEND BATTERY POWER IN REMOTE TRACKING DEVICES

(71) Applicant: Senaya, Inc., Framingham, MA (US)

(72) Inventors: Mrinmoy Chakraborty, Bangalore (IN); Dadi Setiadi, Edina, MN (US); Brian Lee, Boston, MA (US); Jamshed Dubash, Shrewsbury, MA (US); Jahangir Nakra, Titusville, NJ (US)

(73) Assignee: Senaya, Inc., Framingham, MA (US)

( * ) Notice: Subject to any disclaimer, the term of this patent is extended or adjusted under 35 U.S.C. 154(b) by 312 days.

(21) Appl. No.: 14/190,904

(22) Filed: Feb. 26, 2014

(65) Prior Publication Data

US 2015/0241566 A1    Aug. 27, 2015

(51) Int. Cl.
*G01S 19/34* (2010.01)
*G01S 13/74* (2006.01)
(Continued)

(52) U.S. Cl.
CPC ............... *G01S 19/34* (2013.01); *G01S 13/74* (2013.01); *H04B 1/59* (2013.01)

(58) Field of Classification Search
CPC .......... G01S 19/01; G01S 19/13; G01S 19/34; G01S 13/74; H02K 35/00; H02K 35/02; H02K 35/04; H02K 35/06; A62B 99/00; B60W 10/30; B63G 8/08; B63G 8/12; G08B 25/01; G08B 25/016; G08B 25/10; H04Q 9/00; H04B 1/06; H04B 1/16; H04B 1/26; H04B 1/38; H04B 1/59; H04W 4/008; H04W 52/02; H04W 88/02; H02J 7/0013; H02J 7/0014; H02J 7/0019; H02J 7/0063; H02J 7/32; H02J 9/04; H02J 9/06; H02J 9/066; H02J 17/00; G06K 7/0008; G06K 7/10; G06K 7/10009; G06K 7/10316; G06K 7/10336; G06K 19/06; G06K 19/067; G06K 19/07; G06K 19/0701; G06K 19/0702; G06K 19/0705; G06K 19/0707
See application file for complete search history.

(56) References Cited

U.S. PATENT DOCUMENTS 1,380,304 A * 5/1921 Norton ................... B63G 8/12
                                                      114/337
3,098,975 A * 7/1963 Schneiderman ......... H04B 1/26
                                                      455/227
(Continued)

OTHER PUBLICATIONS

U.S. Appl. No. 14/038,341, "Pattern Recognition Based Motion Detection for Asset Tracking System," filed Sep. 26, 2013, United States Patent and Trademark Office.
(Continued)

*Primary Examiner* — Bernarr Gregory
(74) *Attorney, Agent, or Firm* — Holzer Patel Drennan

(57) ABSTRACT

An RF asset-tracking device that has an extended operational life, thus increasing the duration between battery replacement or maintenance. The asset-tracking device is provided with an electro-mechanical energy-harvesting device to supplement the battery. The energy-harvesting device provides additional power to augment the battery on a temporary basis, when the battery level is low, until the battery can be replaced. In one particular embodiment, the tracking device has a power management system, a battery power source and a battery monitor, and an electro-mechanical energy-harvesting device and a high capacity supercapacitor operably connected to the power management system.

13 Claims, 5 Drawing Sheets

(51) Int. Cl.
*H04B 1/59* (2006.01)
*G01S 19/00* (2010.01)
*G01S 13/00* (2006.01)

(56) References Cited

U.S. PATENT DOCUMENTS

| | | | | |
|---|---|---|---|---|
| 3,514,625 A | * | 5/1970 | Lane | H02J 9/066 307/67 |
| 4,418,426 A | * | 11/1983 | Singletary | H04B 1/38 455/573 |
| 6,041,242 A | * | 3/2000 | Coulthard | H04W 88/02 455/347 |
| 6,281,797 B1 | | 8/2001 | Forster et al. | |
| 6,661,116 B1 | * | 12/2003 | Seto | H02J 7/0063 307/10.1 |
| 6,734,796 B2 | | 5/2004 | Forster et al. | |
| 7,266,396 B2 | * | 9/2007 | Terzian | H02J 7/32 455/343.1 |
| 7,400,253 B2 | * | 7/2008 | Cohen | H04Q 9/00 235/383 |
| 7,501,944 B2 | | 3/2009 | Hyde | |
| 7,565,968 B2 | * | 7/2009 | Lindley | A62B 99/00 206/223 |
| 7,791,455 B1 | | 9/2010 | MacLean, III et al. | |
| 7,812,714 B2 | * | 10/2010 | Sakai | G08B 25/016 324/433 |
| 7,864,028 B2 | * | 1/2011 | Sakai | G08B 25/10 180/271 |
| 8,035,335 B2 | * | 10/2011 | Duron | H02J 17/00 320/101 |
| 8,143,996 B2 | * | 3/2012 | Sarangapani | G06K 7/0008 340/10.2 |
| 8,310,103 B2 | * | 11/2012 | Fischer | H02J 7/0019 307/66 |
| 9,090,253 B2 | * | 7/2015 | Flath | B60W 10/30 |
| 2007/0200724 A1 | * | 8/2007 | Lazo | G06K 7/10336 340/693.1 |
| 2008/0001577 A1 | | 1/2008 | Sather | |
| 2011/0163857 A1 | * | 7/2011 | August | G06K 19/0707 340/10.42 |
| 2012/0242453 A1 | * | 9/2012 | Delgado | G06K 19/0705 340/10.1 |
| 2013/0157569 A1 | * | 6/2013 | Torvmark | H04W 4/008 455/41.2 |
| 2013/0321122 A1 | | 12/2013 | Lee et al. | |
| 2013/0321211 A1 | | 12/2013 | Chakraborty et al. | |
| 2013/0324059 A1 | * | 12/2013 | Lee | H04W 52/02 455/127.1 |
| 2013/0324151 A1 | | 12/2013 | Lee et al. | |
| 2013/0324152 A1 | | 12/2013 | Lee et al. | |
| 2014/0018023 A1 | | 1/2014 | Lee et al. | |

OTHER PUBLICATIONS

U.S. Appl. No. 14/140,330, "Methodology to Extend Battery Power in Asset-Tracking Device", filed Dec. 24, 2013, United States Patent and Trademark Office.

U.S. Appl. No. 14/140,304, "Method and Apparatus for Activation and Deactivation of Aircraft Container Tracking Device", filed Dec. 24, 2013, United States Patent and Trademark Office.

U.S. Appl. No. 14/178,472, "Power Management System for Aircraft Container Tracking Device", filed Feb. 12, 2014, United States Patent and Trademark Office.

* cited by examiner

SYSTEM TO EXTEND BATTERY POWER IN REMOTE TRACKING DEVICES

FIELD OF THE DISCLOSURE

The present disclosure is directed to wireless asset tracking devices and systems. More particularly, the present disclosure is directed to features configured to extend the battery life of the tracking device.

BACKGROUND

In industry nowadays, success or failure depends in part upon knowing the up-to-date status of various assets. For example, in the freight delivery business, up-to-date knowledge of the location and, in some instances, the environment of various assets, such as pallet goods, is critical to efficient and reliable operations. Failure to maintain up-to-date status information can result in temporarily lost assets, sub-optimal use of the assets, and in the case of freight delivery, missed or late deliveries.

Recently, technologies have been developed that greatly assist in tracking locations of assets. Radio frequency identification (RF or RFID) systems have been developed in which transmitter devices, often referred to as "tags," wirelessly communicate with readers. RF tracking systems are typically used in parcel tracking and sorting, container tracking, luggage tracking, retail tracking, warehouse tracking and inventory operations. The RF transmitter devices may be either passive or active. Passive devices absorb signals transmitted by the reader and retransmit their own signals, such as identification information. While passive transmitter devices do not require a local energy source, their resulting transmit range is relatively short, typically less than 5-10 meters. In contrast, active transmitters, which send a signal to indicate their location, include a local energy source (such as a battery) that improves transmission range. Depending on the wireless signal system used by the device, the range may be on the order of several meters or several hundred meters. Regardless of the types of transmitter device used, knowledge of the fixed location of the reader device allows users to identify the location of the asset that has a tracking device attached thereto.

Active tag systems are preferred for some applications due to their long range transmission range. Unfortunately, the position signal or date "ping" drains battery life of the transmitter device, thus resulting in added operational cost of the system, due to needed recharging or replacement of the battery.

SUMMARY

The expectation of these devices is to have autonomous operation for extended periods of time. The impact of reduced battery life is more frequent maintenance cycles, increased operational expenses, potential loss of the asset if the battery dies, loss of communication etc. The present disclosure provides an RF asset-tracking device that has an extended operational life, thus increasing the duration between battery replacement or maintenance. The asset-tracking device is provided with an electro-mechanical energy-harvesting device to supplement the battery. The energy-harvesting device provides additional power to the battery on a temporary basis, when the battery level is low, until the battery can be replaced. For embodiments where the battery is a rechargeable battery, the energy-harvesting device provides energy to charge the battery and augment the existing charge.

By including an electro-mechanical energy-harvesting device in the asset-tracking device, the in-field or in-use life of the remote tracking device is significantly increased, maintenance cycle duration is increased (that is, the duration between maintenance events is increased and the number of maintenance events per year is decreased), and overall, the efficiency of utilization of the device is increased.

This disclosure provides, in one particular embodiment, a wireless RF transmitter device having a battery power source and an electro-mechanical energy-harvesting device operably connected to a power management system to augment the battery power source.

In another particular embodiment, this disclosure provides a wireless RF tracking device having an RF communication module and a multiple-source power source. The multiple-source power source has a power management system, a battery power source and a battery monitor, and an electro-mechanical energy-harvesting device operably connected to the power management system.

In yet another particular embodiment, this disclosure provides a wireless RF tracking device having a multiple-source power source that includes a power management system, a battery power source and a battery monitor, the battery power source operably connected to the power management system, and a multimodal electro-mechanical energy-harvesting device and a high capacity supercapacitor operably connected to the power management system.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which.

DISCUSSION OF THE INVENTION

Figure 1:
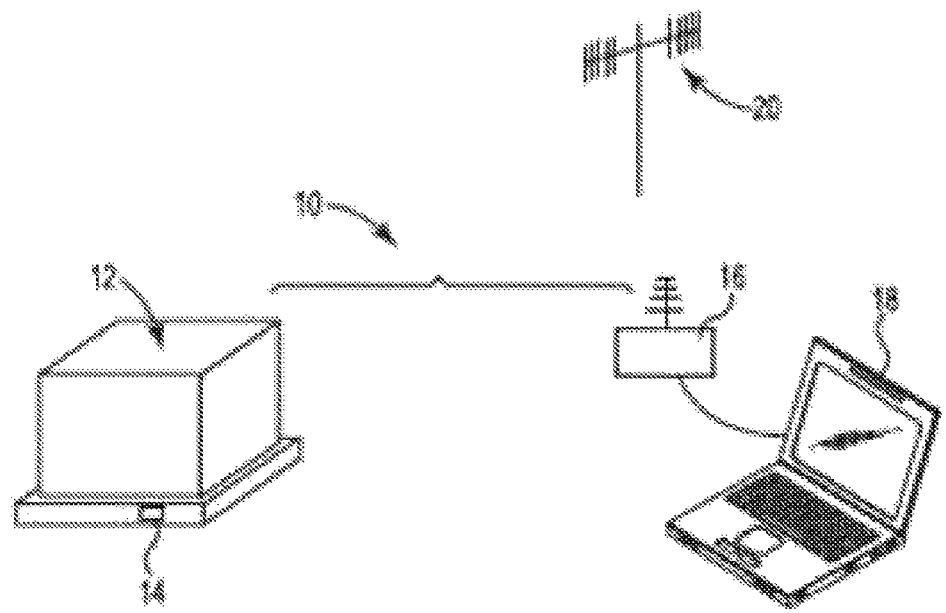
FIG. 1 is a schematic diagram of a wireless asset-tracking system including a tracking device and a receiver.

It is well established that the lifetime of a battery used in remote tracking devices is limited to the capacity of the battery and the drain placed on it by the device. In most operations, the battery can only be replaced during regular maintenance schedule. If the battery gets depleted before the schedule maintenance appointment, the remote tracking device will not be able to identify its location and will loose communication between itself and its host. The asset in which the remote tracking device is placed could get lost. Therefore, there is a significant need for fault tolerant power management of the remote tracking device.

Including an energy-harvesting device in the remote tracking device is an embodiment of fault tolerant power management. An energy-harvesting device will provide additional power to the battery on a temporary basis until the scheduled maintenance or the battery is replaced. In embodiments where a rechargeable battery is used, the energy-harvesting device will provide energy to charge the battery and augment the existing charge in the rechargeable battery.

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

A wireless tracking system is highly beneficial in knowing the physical location of an asset at a set point in time. A "tracking system" and variations thereof includes at least one tracking or transmitter device, and a receiver for receiving the location signal from the tracking transmitter device(s). A "tracking device," "asset-tracking device," "transmitter device," "remote transmitter," and variations thereof, is a signal emitting device configured for placement in or on an asset to be tracked, such as a container of goods.

Assets and products move through different paths and supply chains during the course of their lifetime. There is a need to track these assets and products owing to their value or for business justification purposes. The asset-tracking device therefore becomes critical in solving this problem. The device uses established wireless communication mechanisms to identify its location and convey that information back to the user.

FIG. 1 illustrates a generic tracking system. A "tracking system" and variations thereof includes at least one tracking or transmitter device, and a receiver for receiving the location signal from the tracking transmitter device(s). A "tracking device," "transmitter device," and variations thereof is a portable, signal emitting device configured for placement in or on an asset to be tracked, such as a container of goods, the device including non-volatile memory. FIG. 1 illustrates a tracking system 10 having a transmitter device 14 associated with (e.g., located on) an asset 12. Transmitter device 14 is an active RF tag, having the capability to actively transmit and/or provide interactive information to a receiver 16, located remote from asset 12 and transmitter device 14. Receiver 16 is operably connected to a computer, server, or display 18. System 10 uses an established wireless communication network 20 to identify the location of transmitter device 14 and convey that information to display 18. Examples of wireless RF communication networks 20 with which system 10 can function include ZIGBEE™ communication network standard, BLUETOOTH™ Low Energy (BLE) network, WiFi (sometimes referred to as WLAN) network, LTE network, and WiMax network. In some embodiments, a CDMA/GMS communication network, which can be considered to be a cellular frequency, may be additional or alternately used.

Figure 2:
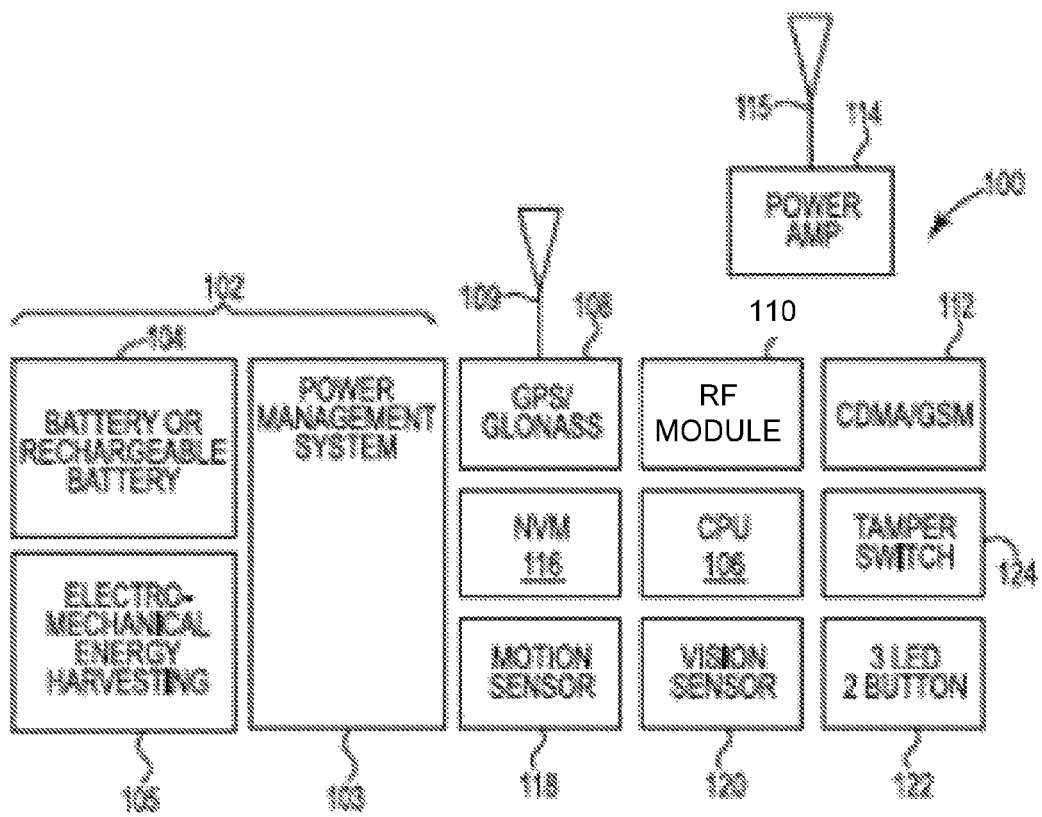
FIG. 2 is a schematic block diagram of a wireless tracking device.

A particular embodiment of a tracking device (e.g., transmitter device 14 of FIG. 1) is illustrated in FIG. 2. Tracking or tracking device 100 of FIG. 2, together with a receiver (e.g., receiver 16 of FIG. 1), forms a tracking system (e.g., system 10 of FIG. 1). FIG. 2 and the following discussion are directed to one particular wireless tracking device. It is understood that other configurations and designs of the tracking device may be used in conjunction with the energy-harvesting technique of this disclosure. Tracking device 100 switches between RF and cellular communication networks, depending on availability the communication network.

Device 100 has a multi-source power source 102 that incorporated a power management system 103, a primary power source 104 and a secondary power source 105. Primary power source 104 includes a (rechargeable) battery, and secondary power source 105 is an electro-mechanical energy-harvesting device, optionally and preferably with high capacity supercapacitor. Both sources 104, 105 are operably (electrically) connected to power management system 103.

Examples of suitable batteries for primary power source 104 include NiCad, lithium, lithium-ion, zinc-carbon, and alkaline batteries. For example, a 3.7V battery could be used, although it is understood that other voltage batteries could be used. Example of suitable rechargeable batteries for the primary power source 104 include lead-acid, nickel cadmium (NiCd), nickel metal hydride (NiMH), lithium ion (Li-ion), and lithium ion polymer (Li-ion polymer)

Secondary power source 105, i.e., an energy-harvesting device optionally with a supercapacitor, may be a single device or may be a plurality of devices arranged in parallel. In some embodiment, it preferred that the energy-harvesting device is a broadband vibration energy-harvesting device. The high capacity super capacitor can be, for example, a double-layer capacitor, a pseudocapacitor, or a hybrid capacitor.

Power management system 103 includes a power level (e.g., battery level) monitor and a power control, which in turn is operably connected to a computer chip or CPU 106. Power management system 103 manages and regulates the usage of the primary and secondary power sources 104, 105. For example, if the available power (e.g., current) from primary battery source 104 is low, power management system 103 may activate secondary power source 105, thus either supplementing or replacing the power being used from primary source 104. Present within CPU 106 is appropriate circuitry and programming to implement this power management technique with device 100.

Tracking device 100 also includes a positioning element, in this embodiment a GPS/GLONASS positioning element 108 connected to an antenna 109, which may be an internal antenna or an external antenna, and may be embedded into a housing encasing the elements of device 100. Antenna 109 may be, for example, a planar inverted F antenna, an inverted L antenna, or a monopole antenna. Antenna 109 may be a multi-band antenna, one that can transmit and receive signals in multiple frequency bands. In other embodiments, the positioning element may include mobile station-assisted (MSA) operation to enable accurate positioning at locations where GPS/GLONASS is unavailable or impaired. Positioning element 108 provides data to tracking device 100 regarding its physical location.

Tracking device 100 transmits information or data, such as its location, in the form of a "ping" to the remote receiver (e.g., receiver 16 of FIG. 1) via a wireless network, such as ZIGBEE™ standard network and/or WiFi network. In some embodiments, tracking device 100 has two-way communication with the receiver. That is, tracking device 100 transmits information (i.e., a ping) and also receives information from the receiver. Further, tracking device 100 may receive instructions, such as to acknowledge that device 100 is active and ready and to transmit the location information. Having received those instructions, device 100 can send back to the receiver acknowledgement that the communication was received and acted on.

As indicated, the tracking device is configured to send and optionally receive data via a wireless network. Device 100 of FIG. 2 is configured with a ZIGBEE™/BLE module 110 to connect to the receiver via a ZIGBEE™ standard network or a BLE (BLUETOOTH™ low energy) network and communicate data (e.g., position data) to the receiver. An alternate embodiment of a tracking device can utilize a ZIGBEE™/WiFi module and a corresponding ZIGBEE™/WiFi network. Additionally, tracking device 100 may include a data receiver (not shown), such as an infrared data link (IrDA), to provide a second communication means to device 100, as an alternate or back-up to module 110.

Device 100 also includes a cellular communication module 112, which may be CDMA (Code Divisional Multiple Access) and/or GSM (Global System for Mobile Communication) module, configured to connect to the receiver via either a CDMA or GSM network and communicate data to the receiver.

Communication modules 110, 112 may each or together have an antenna 115 which may optionally include a power amplifier 114 to extend the range of the signal from modules 110, 112. In some embodiments, modules 110, 112 may be combined into a single physical module rather than two separate or distinct modules. Together, modules 110, 112 provide the communication basis for tracking device 100 to and from the receiver. Module 110, which connects device 100 a wireless RF network, can be utilized when regulations allow use of RF communications, and module 112, which connects device 100 to a cellular network, can be utilized, for example, in situations when regulations do not allow the use of RF communications yet do allow cellular communications.

Any of the data or information regarding device 100, such as its position as determined by positioning element 108, alarm information, battery level information, etc., can be stored in a memory 116 of device 100, which may be a permanent memory or a rewritable (e.g., nonvolatile) memory.

Tracking device 100 includes a motion sensor 118 and a vision sensor 120 to determine the orientation, location and/or movement of device 100. Motion sensor 118 may be a single sensor or an array of sensors. An example of a suitable motion sensor 118 is a 10-degree of freedom (DOF) device that includes a 3-axis gyroscope, 3-axis accelerometer, 3-axis magnetometer, and an altitude sensor. Other embodiments of motion sensor 118 may be used; for example, a three degree of freedom (DOF) device having a 3-axis accelerometer or a six degree of freedom (DOF) device having a 3-axis gyroscope and a 3-axis accelerometer. Another example of s suitable configuration for motion sensor 118 includes a 9-DOF device that includes a 3-axis gyroscope, a 3-axis accelerometer and a 3-axis magnetometer. By sensing the various multiple degrees of freedom, device 100 can distinguish among various movements, orientations and locations, such as lateral motion, acceleration, inclined or declined motion, and altitude.

Device 100 may also include an indicator console 122 having various operational switches, gauges, buttons, and/or lights (e.g., LED lights); in the particular embodiment shown, indicator console 122 has 3 LED lights and 2 buttons. Console 122 may include any number of optional features, such as an audio alarm to indicate any number of problems or malfunctions, such as low battery level, unauthorized movement (as sensed by motion sensor 118), or tampering with device 100 in any manner, as sensed by tamper switch 124. Device 100 may optionally include a temperature sensor.

Device 100 typically has an initializing state that includes a reset state, a data or ping state, and an idle state. First, the device is in reset state. After the device is reset, the device will attempt to send a ping to a host (e.g., receiver 16 of FIG. 1) identifying that the device is alive and to determine its location.

Device 100 can be configured to have its data collection or ping event be event-based or time-based, or based on any other protocol. Examples of various event-based protocols, identified as SMART Ping™ events, such as described in U.S. Patent Application Publication 2013/0321211 titled "Asset Tracking System with Adjusted Ping Rate and Ping Period," U.S. Patent Application Publication 2013/0324151 titled "Asset Tracking System with Data Ping Based on Asset Movement," U.S. Patent Application Publication 2013/0324152 titled "Asset Tracking System Activated by Predetermined Pattern of Asset Movement," and U.S. Patent Application Publication 2014/0085055 titled "Pattern Recognition Based Motion Detection for Asset Tracking System," all which are incorporated herein by reference in their entirety, can further be used to optimize power consumption. Another method, which stores multiple data points and sends it once, described in U.S. Patent Application Publication 2014/0187261 titled "Methodology to Extend Battery Power in Asset-Tracking Device" and also incorporated herein by reference in its entirety, can additionally or alternately be used.

No matter the specific embodiment of the wireless or remote tracking device, the tracking device includes a battery for long-term autonomous operation. However, the useful life time of this battery is limited and is much less than that of the tracking device itself. Because of this, the battery typically needs to be replaced before the tracking device does; for most tracking devices, the battery will be replaced multiple times during the life of the tracking device. Typically the battery will be only replaced during a scheduled maintenance appointment. If the battery power is depleted below the required level before the scheduled maintenance, communication between the device and the receiver is lost.

Fault-tolerant power management enables the tracking device to continue operation, albeit possibly at a reduced level or via graceful degradation, rather than to fail rapidly and completely. In anticipation of the battery being depleted before scheduled maintenance and to protect the asset from being lost, a secondary source of power is added to the device to cope with this situation; this secondary source of power is an energy-harvesting device.

Figure 3:
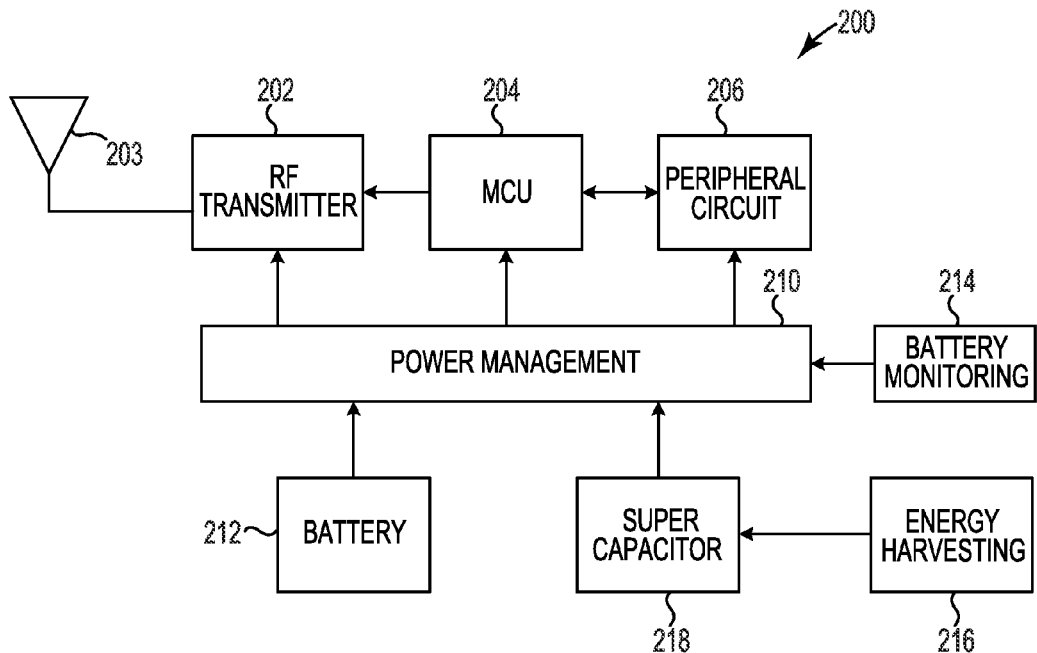
FIG. 3 is a schematic block diagram of a tracking device, showing the power management system.

As seen in FIG. 3, a tracking device 200 generally includes a communication module 202, in this embodiment an RF transmitter, with an antenna 203, a microcontroller unit 204, and various circuitry 206, all which are operably connected to and receive power from a power management system 210, which is an embodiment of fault tolerant power management. Power management system 210 includes a battery 212, a battery monitoring mechanism 214, an energy-harvesting device 216 coupled to a high capacity super capacitor 218. In this embodiment, energy-harvesting device 216 provides a secondary source of power to system 210, such as in situations where the level of battery 212 is lower than desired. In other situations, battery 212 may be fully charged or at least adequately charged, with energy-harvesting device 216 providing additional power to system 210. This energy-harvesting device 216 will provide additional power to augment that from battery 212 on a temporary basis until the scheduled maintenance takes place or battery 212 is replaced. In embodiments where a rechargeable battery is used, the energy-harvesting device will additionally provide energy to charge the battery as shown in FIG. 4.

Figure 4:
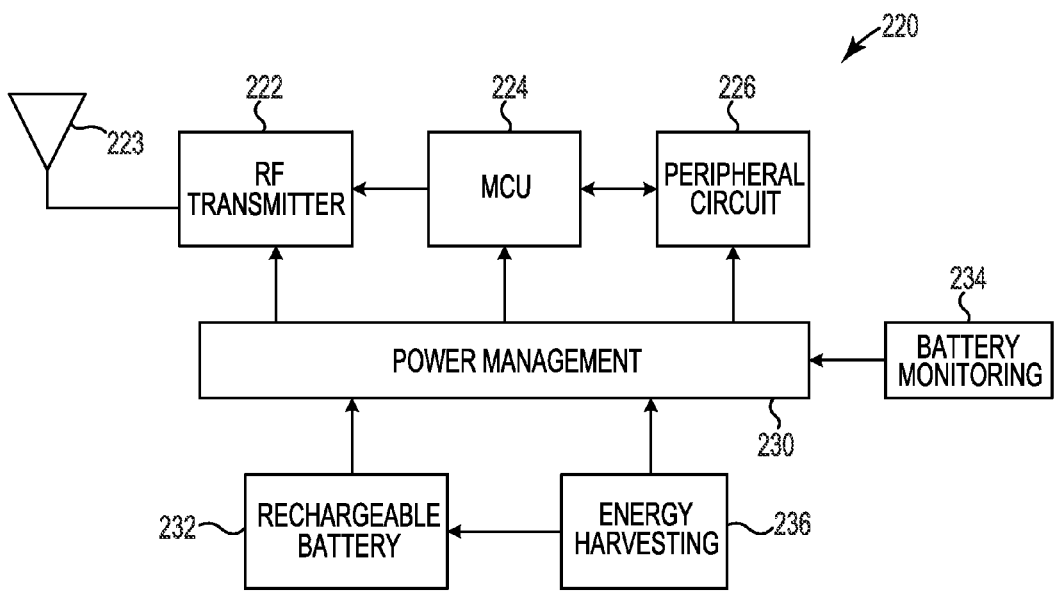
FIG. 4 is an alternate schematic block diagram of a tracking device, showing the power management system.

In FIG. 4, a tracking device 220 generally includes a communication module 222, in this embodiment an RF transmitter, with an antenna 223, a microcontroller unit 224, and various circuitry 226, all which are operably connected to and receive power from a power management system 230. Power management system 230 includes a rechargeable battery 213, a battery monitoring mechanism 234, and an energy-harvesting device 236. In this embodiment, energy-harvesting device 236 provides a secondary source of power to system 230, both by augmenting the power from battery 232 but also by providing power directly to battery 232, and thus at least partially recharging battery 232.

Different energy sources existing in the environment around a system, such as sunlight, wind, and mechanical vibration, can be the options for energy harvesting. Among them, pervasive vibration sources are suitable for small-scale power generation of low-power electronics. Vibration-to-electricity transduction can be accomplished via electrostatic, electromagnetic, or piezoelectric methods. Examples of suitable electro-mechanical energy-harvesting techniques or devices include ceramic lead zirconate titanate (PZT), thin film PZT MEMS device, and aluminum nitride (AlN) MEMS devices.

In practice, energy-harvesting systems are multiple degree-of-freedom (DOF) systems or distributed parameter systems. One of the vibrational modes of the harvesting device can be excited when the driving frequency approaches the natural frequency associated with the particular mode. If multiple vibration modes of the harvesting are utilized, useful power can be harvested, i.e., a wider bandwidth can be covered for efficient energy harvesting. Here, such techniques are termed "multimodal energy-harvesting." Although the discussion herein refers to "an energy-harvester" and variations thereof, it is to be understood that a single energy-harvester can function with multiple frequencies and bandwidths.

Bimodal or multimodal energy harvesting can be implemented, for example, by exploiting a cantilever array (i.e., multiple cantilevers) integrated in one device; the first mode of each cantilever is one of the vibration modes of the device. Compared to resonance tuning techniques, multimodal energy harvesting does not require tuning and, hence, is much easier to implement. By using cantilever arrays, the targeted bandwidth is broader and can be covered continuously by proper selection of the system parameters.

Different from the discrete bandwidth corresponding to the multiple modes of a single beam, multiple cantilevers or cantilever arrays integrated in one energy-harvesting device can easily achieve continuous wide bandwidth if the geometric parameters of the harvesting device are appropriately selected. In some embodiments, however, sophisticated interface circuits may be needed to avoid charge cancellation due to the phase difference between the cantilevers in array configurations; for example, connected or coupled bimorph cantilever beams can be used for energy-harvesting, whose resonant frequencies are tuned to be very close to each other.

In the cantilever array configuration, only one cantilever or a subset of the array is active and effective for energy generating while the other cantilevers are at an off-resonance status. The amplitude and location of the resonances were found to be sensitive to the end spring and end masses. Hence, with the known dominant spectrum of the ambient vibration, the harvesting should be carefully designed with a proper number and dimensions of the cantilevers such that the device can cover the targeted bandwidth with the least sacrifice of power density.

Figure 5:
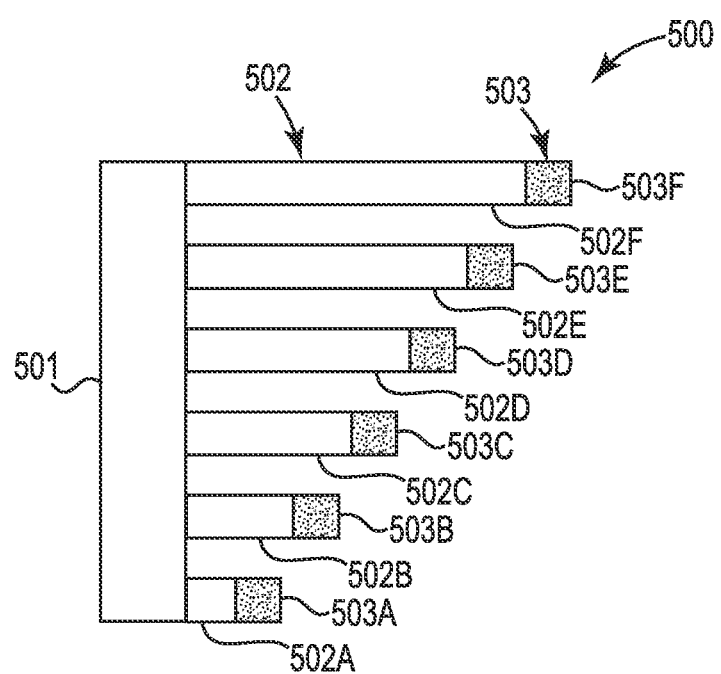
FIG. 5 is a schematic diagram of an electro-mechanical energy-harvesting device.

FIG. 5 shows a schematic rendering of an electro-mechanical energy-harvesting device 500 that includes a base 501 and a plurality of piezoelectric cantilevers 502 (specifically 502A, 502B, 502C, 502D, 502E, and 502F) attached thereto. Each cantilever 502 has a tip mass 503 (specifically 503A, 503B, 503C, 503D, 503E, and 503F). Each cantilever 502 has a unique length; that is, the length of cantilevers 502 varies. Tip masses 503 may or may not vary across the multiple cantilevers 502. Energy-harvesting device 500 is capable of resonating at multiple frequencies and to provide voltage response over a wide frequency range. The frequency of each cantilever 502 can be designed by selecting the length and tip mass 503 of each beam 502. Device 500 formed using MEMS-based thin film PZT. Although not shown in FIG. 5, each cantilever 502 can be connected to a separate rectifier to provide a total DC voltage of 3.7 V.

Returning to FIG. 3 and FIG. 4, all components of the power sources (e.g., of battery power source 212, rechargeable battery 232, electro-mechanical energy-harvesting device 216/236, high capacity super capacitor 218, battery monitoring mechanism 214/234, etc.) are environmentally friendly (e.g., RoHS, REACH, UN, UL, FM, FDA compliant). Additionally, they can operate at temperatures between −20° C. and 60° C. and can be stored at temperatures between −55° C. and 85° C.

For example, battery 212/232 is made from non-explosive, and non-toxic material; it has a low leakage current, a rated capacity between 500 mAh and 1000 mAh, and a long shelf life. High capacity supercapacitor 218 is also made from non-explosive and non-toxic material; it has a high energy density, high capacitance up to 100 Farads, a high peak current up to 1 A, low impedance (ESR), rapid charging and discharging; it has a long life (little or no degradation over hundreds of thousands of cycles, and not subject to the wear and aging).

Figure 6:
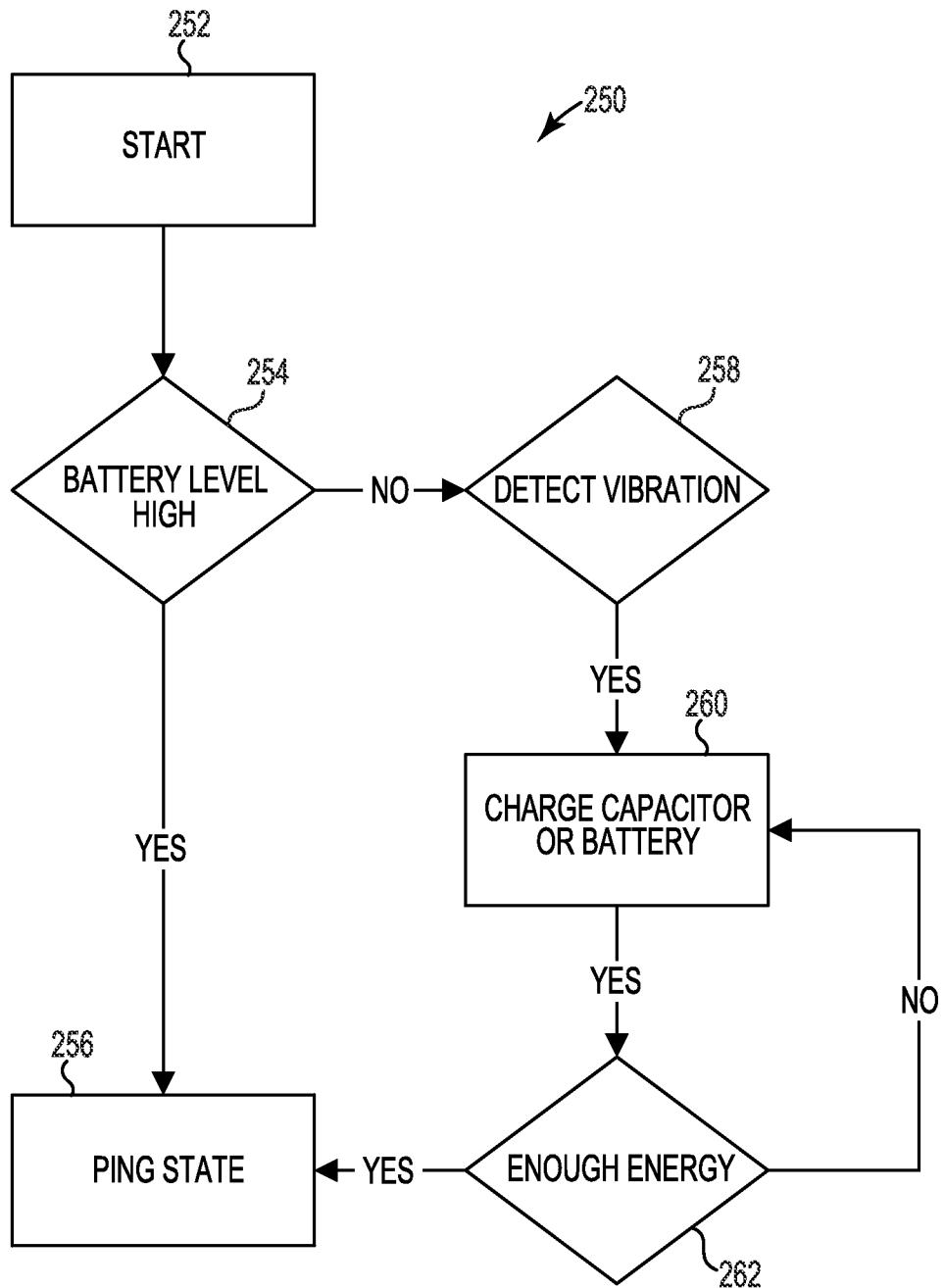
FIG. 6 is a flow chart for operation of a fault-tolerant power management system having an electro-mechanical energy-harvesting device.

FIG. 6 shows a flow chart for operation of exemplary fault-tolerant power management for a tracking device with an electro-mechanical energy-harvesting device and a rechargeable battery (e.g., tracking device 220 of FIG. 4). After a starting point 252, the battery level is evaluated at operation 254. If the battery level is high, the tracking device can communicate with the remote receiver or host at operation 256. If the battery level is low, motion sensors in the device activate. When vibration is detected, at operation 258, the electro-mechanical energy-harvesting device converts the mechanical vibration into electrical voltage by charging the capacitor or battery at operation 260, as the case may be. As long as the energy level threshold is not reached (operation 262), all circuits continue to remain in sleep mode and the capacitor or battery continues to charge. When the threshold is reached at operation 262, the tracking device can communicate with the remote receiver.

Figure 7:
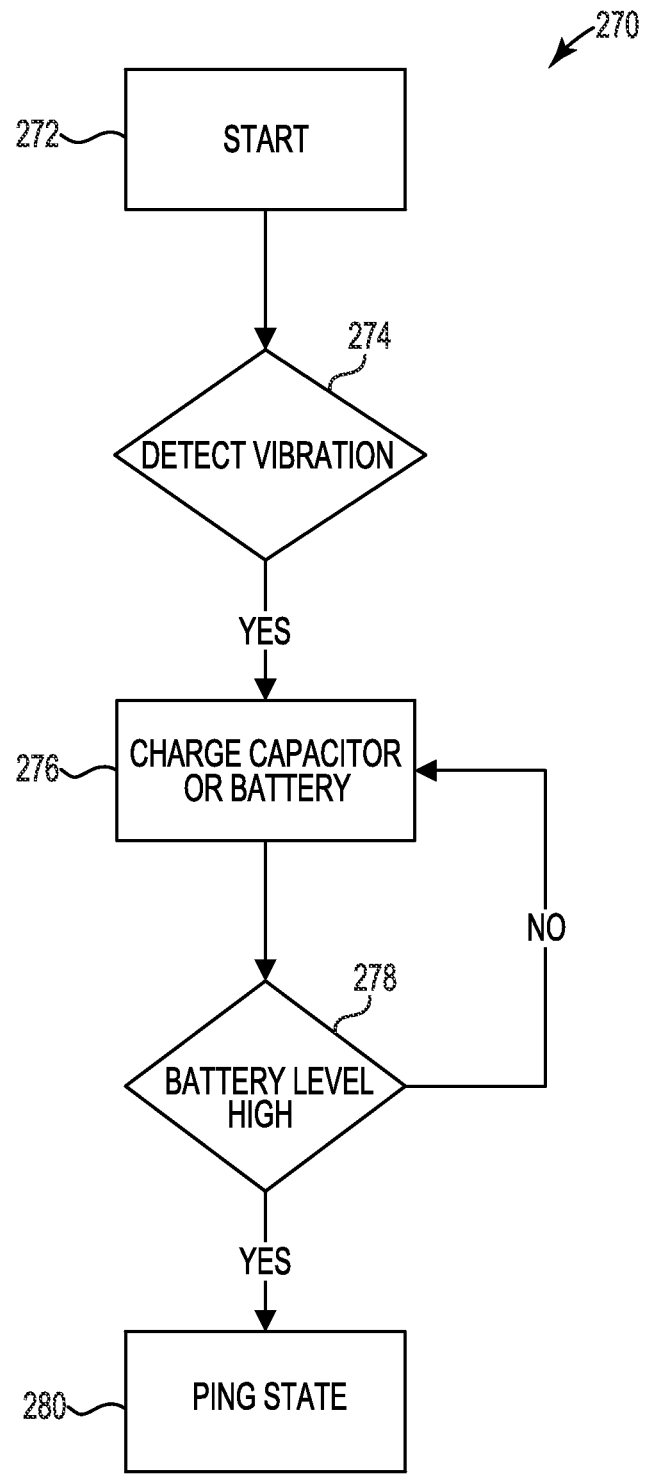
FIG. 7 is a flow chart for operation of a fault-tolerant power management system having an electro-mechanical energy-harvesting device and a rechargeable battery.

FIG. 7 shows another flow chart example for operation of an exemplary fault-tolerant power management for a tracking device with rechargeable battery and an electro-mechanical energy-harvesting device (e.g., tracking device 220 of FIG. 4). From starting point 272, motions sensors in the device action, and when a vibration is detected at operation 274, the electro-mechanical energy-harvesting device converts the mechanical vibration into electrical voltage by charging the capacitor or battery at operation 276. If the battery level threshold is not reached (operation 278), all circuits are in sleep mode and the capacitor or battery continues to charge. If the battery power threshold is reached (operation 278), the tracking device can communicate with the remote receiver or host at operation 280.

Thus, various embodiments of the SYSTEM TO EXTEND BATTERY POWER IN REMOTE TRACKING DEVICES are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A wireless RF tag comprising:
an RF communication module; and
a multiple-source power source comprising a power management system, a battery power source and a battery monitor, and an electro-mechanical energy-harvesting device operably connected to the power management system.

2. The wireless RF tag of claim 1, the power source further comprising a high energy supercapacitor operably connected to the energy-harvesting device and to the power management system.

3. The wireless RF tag of claim 2, wherein the energy-harvesting device comprises a plurality of cantilevers.

4. The wireless RF tag of claim 2, wherein the energy-harvesting device is multimodal.

5. The wireless RF tag of claim 1 further comprising a motion sensor.

6. The wireless RF tag of claim 1 further comprising a GPS positioning element.

7. The wireless RF tag of claim 1, wherein the RF communication module conforms to a IEEE 802.15.4 protocol standard.

8. A wireless RF tag comprising a multiple-source power source comprising:
a power management system;
a battery power source and a battery monitor, the battery power source operably connected to the power management system; and
a multimodal electro-mechanical energy-harvesting device and a high capacity supercapacitor operably connected to the power management system.

9. The wireless RF tag of claim 8, wherein the electro-mechanical energy-harvesting device and the high capacity supercapacitor provide current to the power management system to augment the battery power source.

10. The wireless RF tag of claim 8, wherein the electro-mechanical energy-harvesting device and the high capacity supercapacitor provide power to recharge the battery power source.

11. The wireless RF tag of claim 10, wherein the electro-mechanical energy-harvesting device and the high capacity supercapacitor additionally provide current to the power management system.

12. The wireless RF tag of claim 8 further comprising a motion sensor.

13. The wireless RF tag of claim 8, wherein the electro-mechanical energy-harvesting device is a broadband vibration energy-harvesting device.

* * * * *